(12) United States Patent
Bolden et al.

(10) Patent No.: US 9,083,031 B2
(45) Date of Patent: Jul. 14, 2015

(54) BATTERY HOLD DOWN DEVICE INCLUDING GRIPPABLE HANDLE AND SPRING ARRANGEMENT

(76) Inventors: Darnell M. Bolden, Hughesville, MD (US); Richard C. Lee, Upper Marlboro, MD (US)

( * ) Notice: Subject to any disclaimer, the term of this patent is extended or adjusted under 35 U.S.C. 154(b) by 183 days.

(21) Appl. No.: 13/609,229

(22) Filed: Sep. 10, 2012

(65) Prior Publication Data

US 2013/0252060 A1    Sep. 26, 2013

Related U.S. Application Data

(60) Provisional application No. 61/613,984, filed on Mar. 22, 2012.

(51) Int. Cl.
*H01M 2/10* (2006.01)
*B23P 11/00* (2006.01)

(52) U.S. Cl.
CPC ........ *H01M 2/1077* (2013.01); *Y10T 29/49948* (2015.01)

(58) Field of Classification Search
CPC ................... H01M 2/1077; Y10T 29/49948
USPC .............. 429/94, 96, 100; 180/68.5; 248/503
See application file for complete search history.

(56) References Cited

U.S. PATENT DOCUMENTS

| 1,459,973 | A | * | 6/1923 | Colgan ................... 180/68.5 |
| 1,465,660 | A | * | 8/1923 | Alborn ................... 180/68.5 |
| 1,636,562 | A | * | 7/1927 | Hick ...................... 180/68.5 |
| 3,254,736 | A | * | 6/1966 | Gass ...................... 180/68.5 |
| 4,327,809 | A | * | 5/1982 | Fenstermaker ........... 180/68.5 |
| 4,926,953 | A | * | 5/1990 | Platt ...................... 180/68.5 |
| 2004/0144908 | A1 | * | 7/2004 | Shannon, Jr. ............. 248/505 |
| 2006/0071481 | A1 | * | 4/2006 | Anzai .................... 292/256 |

* cited by examiner

*Primary Examiner* — Sean P Cullen

(57) ABSTRACT

The present invention provides a device and a method for securely clamping and unclamping a battery in a battery receiving tray, wherein at least one hold down rod is securely connected to the battery receiving tray on one end and at the other end, is held against one or more horizontally disposed hold down clamps by tension provided by a tensioner operating against a tensioner retaining means at the other end of the hold down rod and the one or more hold down clamps.

20 Claims, 11 Drawing Sheets

BATTERY HOLD DOWN DEVICE INCLUDING GRIPPABLE HANDLE AND SPRING ARRANGEMENT

This invention claims priority to U.S. Provisional 61/613,984 filed Mar. 22, 2012, the disclosure of which is incorporated herein by reference.

FIELD OF THE INVENTION

The present invention relates generally to devices and methods for securely restraining and unrestraining batteries, particularly batteries used for operations in internal combustion engines whether mounted on the engine compartment or elsewhere on the vehicle or machine.

BACKGROUND OF THE INVENTION

Every machine using an internal combustion engine requires a battery primarily to provide direct current for the starter mechanism, usually a starter motor geared to the cranking mechanism. For hybrid vehicles, the batteries are a more integral part of the vehicle's functionality. Batteries also store current for the operation of the machine's other electrical and electronic devices.

Whether placed in the engine compartment of the machine or elsewhere, batteries must be securely held down during operations of the internal combustion engine in order to prevent contacts with the battery posts' terminals.

All machines, including automobiles, typically have a battery hold down mechanism for securing their batteries. The standard battery hold down mechanism uses nuts or locknuts to secure the battery with hold down rods and clamps. Battery replacement tends to require tools; such as ratchets, extensions and sockets, and sometimes the dexterity to reach hard to find crevices in the engine compartment. Furthermore, weather-beaten hold downs are subject to rust and corrosion, making it very difficult for the average consumer to disengage the battery from the hold down rods and hold down clamps. For technicians, replacing batteries, particularly ones with rusted nuts and bolts, can be time consuming. In any case, ratcheting hold down rods and hold down clamps is hazardous as improperly placed tools can bridge the battery posts leading to explosion or electrocution.

In automobile engines, a battery hold down system would typically comprise a cradling or receiving tray for cradling the battery in a battery compartment, openings on the battery compartment or receiving tray for pivotally engaging screw-tipped hold down rods, and horizontally disposed hold down clamps for securely clamping the battery inside the cradling tray and engaging the hold down rods, and washers and nuts for engaging the hold down rods to the clamps.

Henehan (U.S. Pat. No. 2,833,363) uses diagonally disposed j-rods extending from slots on the sidewalls of the battery tray through a clamp designed as a battery retaining loop member and connected thereto by wing nuts.

Hall (U.S. Pat. No. 2,994,395) uses a Z-clamp having a vertically extending member and multiple holes on the horizontal extending member of the clamp for slottable engagement of j-rods between slots on the sidewall of the battery tray and any one of the holes on the horizontal member wherein the rod is fastened to the clamp.

Raney and Zednik, Jr. (U.S. Pat. No. 3,105,566) uses a bottom-mounted system wherein one side of the hold down clamp engages the tray underneath and the opposite side pushes into the side flange near the bottom of the battery. A bolt then secures the hold down clamp to the tray.

Other battery clamping mechanisms are taught in Paller (U.S. Pat. No. 3,125,177), Schlapman (U.S. Pat. No. 3,333,810), Bowers and Breidegam (U.S. Pat. No. 3,834,479, and U.S. Pat. No. 3,866,704). DiFazio (U.S. Pat. No. 4,520,887) relied on a stud from an adjacent mounting structure to secure the hold down, which consisted of a somewhat complicated mix of two angled members interconnected by a cross-bar member, the one end having an eyelet and the opposite end an upstanding tab which connects to the mounting structure. An L bracket was employed on the opposite end. Valdez (U.S. Pat. No. 4,565,256) produced elastomeric hold downs for attenuating shock and allegedly conforming to varying battery venting arrangements.

As used herein, the terms top-mounted and bottom-mounted relate to the position of the hold down clamp with respect to the battery in securing it to the battery receiving tray. If the hold down clamp is across the top of the battery or along its upper rim, the hold down is considered top-mounted. If the hold down clamp is around the lower rim or the bottom flange of the battery the hold down is considered bottom-mounted. The automobile industry generally employs either the bottom or top-mounted methods of securing the battery against the receiving tray.

Heretofore, whenever a battery had to be removed within a shop environment, tools of different shapes and sizes are needed depending on the make and model of the machine. Other challenges include being careful not to lose nuts and other parts of the hold down mechanism as well as being extremely careful not to bridge the posts of the battery with tools in fishing for tools and exerting the torque needed for removal and reinstallation. Often this is done at great expenditure of time and expense to consumers.

SUMMARY OF THE INVENTION

These and other problems are obviated by the present invention which provides a battery hold down device for securely clamping and unclamping a battery in a battery receiving tray, comprising at least one hold down rod, one or more horizontally disposed hold down clamps having one or more openings for passage of the rod there through, and wherein the hold down rod comprises a tensioner for holding down the one or more hold down clamps against the battery and a tensioner retaining means for retaining the tensioner on the hold down rod.

In a preferred embodiment, the tensioner comprises a spring arrangement and the tensioner retaining means comprises a grippable handle.

In a most preferred embodiment, the tensioner comprises a compression spring arrangement having a spring, and top and bottom spring seats, and the tensioner retaining means comprises a grippable handle.

In another preferred embodiment, the one or both spring seats further comprises a vibration damper.

In another embodiment, the vibration damper comprises a rubber grommet.

In yet another preferred embodiment, the compression spring arrangement is encased in a spring capsule.

In one embodiment, the grippable handle is integrally molded unto the hold down rod.

In another embodiment, the grippable handle is screwedly connected to the hold down rod. In another preferred embodiment, the hold down rod is a j-rod having a curved end for slottable engagement of an opening on the receiving tray or battery compartment of the engine.

In yet another preferred embodiment, the battery hold down device comprises two hold down rods for engagement of openings on opposite sides of one hold down clamp.

In another embodiment, the hold down clamp comprises a means for extending the length thereof.

The present invention also provides a tension loaded battery hold down rod adaptable for use in a battery hold down mechanism wherein the hold down rod has a means on one end for engaging an opening on a battery tray and at the other end, comprises a tensioner and a tensioner retaining means for engagement of one or more battery hold down clamps.

In one embodiment of the tension loaded battery hold down rod, the tensioner comprises a spring arrangement.

In a preferred embodiment, the spring arrangement is a compression spring arrangement comprising a spring and top and bottom spring seats.

In another preferred embodiment, the one or both spring seats further comprises a vibration damper.

In another embodiment, the vibration damper comprises a rubber grommet.

In a most preferred embodiment, the compression spring arrangement is encased in a spring capsule.

The present invention also provides a method for securely clamping and unclamping a battery in a battery receiving tray, wherein at least one hold down rod is securely connected to the battery receiving tray on one end and at the other end, is held against one or more horizontally disposed hold down clamps by tension provided by a tensioner operating against a tensioner retaining means at the other end of the hold down rod and the one or more hold down clamps.

In a preferred method, the tensioner comprises a spring arrangement and the tensioner retaining means is a grippable handle.

In a most preferred method, the spring arrangement comprises a compression spring arrangement having a spring and top and bottom spring seats.

In another preferred embodiment, the one or both spring seats further comprise a vibration damper.

In another embodiment, the vibration damper comprises a rubber grommet.

In one method, the compression spring arrangement is encased in a spring capsule.

In another method, the grippable handle is integrally molded unto the hold down rod.

In yet another method, the grippable handle is screwedly connected to the hold down rod.

In another preferred embodiment, the hold down rod comprises a j-rod having a hooked end for slottable engagement of an opening on the battery receiving tray or battery receiving compartment of the engine.

In yet another preferred method, two hold down rods are engaged on opposite sides of one hold down clamp.

In another method, the hold down clamp is extendable.

In yet another method, the one or more hold down clamps is top mounted.

DETAILED DESCRIPTION OF THE INVENTION

The present invention provides a device and a method for securely clamping and unclamping a battery in a battery receiving tray, wherein at least one hold down rod is securely connected to the battery receiving tray on one end and at the other end, is held against one or more horizontally disposed hold down clamps by tension provided by a tensioner operating against a tensioner retaining means at the other end of the hold down rod and the one or more hold down clamps.

Figure 1:
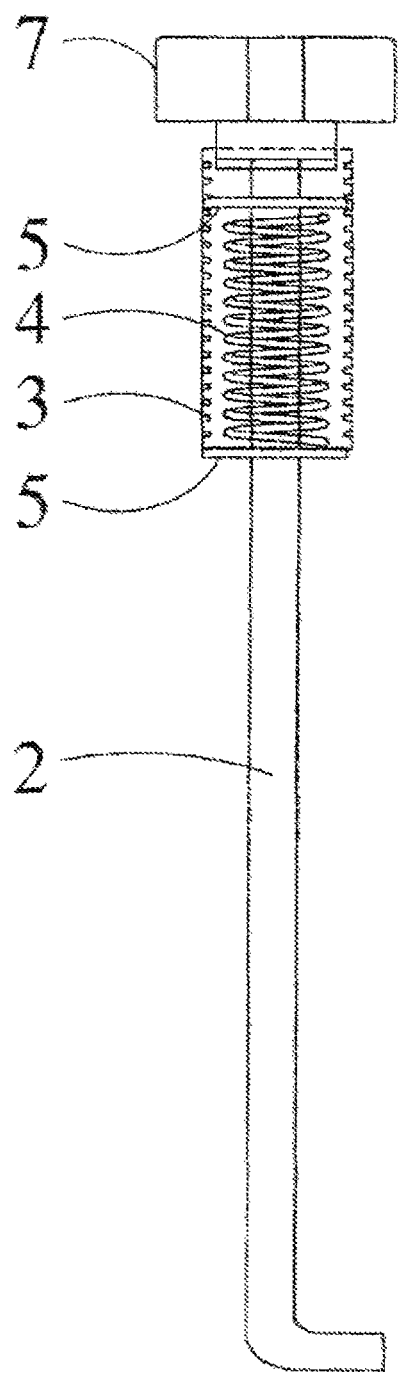
FIG. 1 is an assembled view of a hold down j-rod, a grippable tensioner retaining means and a tensioner in accordance with one embodiment of the invention.
Figure 2:
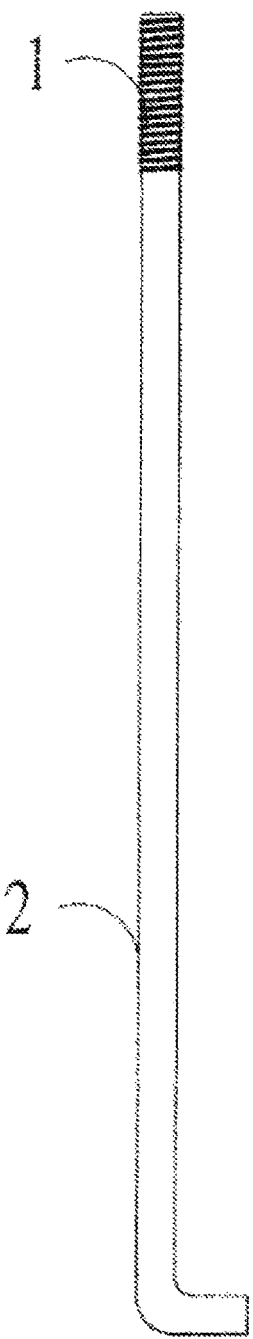
FIG. 2 is a side view of a hold down j-rod in accordance with one embodiment of the invention.

In the drawings in which like numerals represent like elements, FIG. 1 illustrates an assembled view of a hold down j-rod, a grippable tensioner retaining means and a tensioner in accordance with one embodiment of the invention. FIG. 2 is a side view of a hold down j-rod in accordance with one embodiment of the invention. As shown in FIG. 2, one end of the hold down rod 2 in a preferred embodiment is a j-end and the other end 1 is threaded for screwedly receiving a tensioner retaining means 6 or 7 (e.g., a grippable handle). As used herein, a j-rod is one having a j-end wherein j-end is any curved end designed and configured for slottable engagement of a corresponding opening.

The tensioner retaining means 6 or 7 is preferably a grippable handle which can be fitted with a roll rod to tighten it to the hold down rod 2. However, it is preferable to fit the grippable handle 6 or 7 with inner threads to screw unto the threaded end 1 of the hold down rod 2. Grippable handles 6 or 7 replace the need for nuts on the typical hold down mechanisms thus eliminating the use of tools. This grippable handle 6 or 7 is also used to adjust or fine tune the tension on the tensioner 4 (e.g., compression spring) which secures the hold down clamp 8 unto the battery 13, thereby securely retaining the battery 13 in the battery receiving tray 14.

This invention is not limited in anyway by the design of the grippable handle. Although the preferred tensioner arrangement is a spring 4 (e.g., compression spring) having a top and bottom spring seat 5, and optionally having vibration dampers 26 seated therein, a grippable handle 6 or 7 can be designed to incorporate a spring seat 25 and an optional vibration damper 26.

As well, the hold down clamp 8 can be designed to further comprise a bottom spring seat 25 and an optional vibration damper 26.

As used herein, hold down mechanism includes the concerted action of the one or more hold down rods 2, one or more hold down clamps 8 in securely retaining the battery 13 unto the battery receiving tray 14, by means of a tensioner 4.

As used herein, the battery receiving tray 14 includes any flat surface designed to receive a battery 13, whether in the engine compartment or elsewhere on the machine or vehicle. It is understood that the battery receiving tray 14 can comprise a vibration damper 26. Also as used herein, a tensioner 4 is a device that applies a force to an object to maintain it in tension. As used herein, spring seat 5, 25 can be a flat washer or pressure point or any means for receiving the top or bottom end of the compression spring 4.

Figure 7:
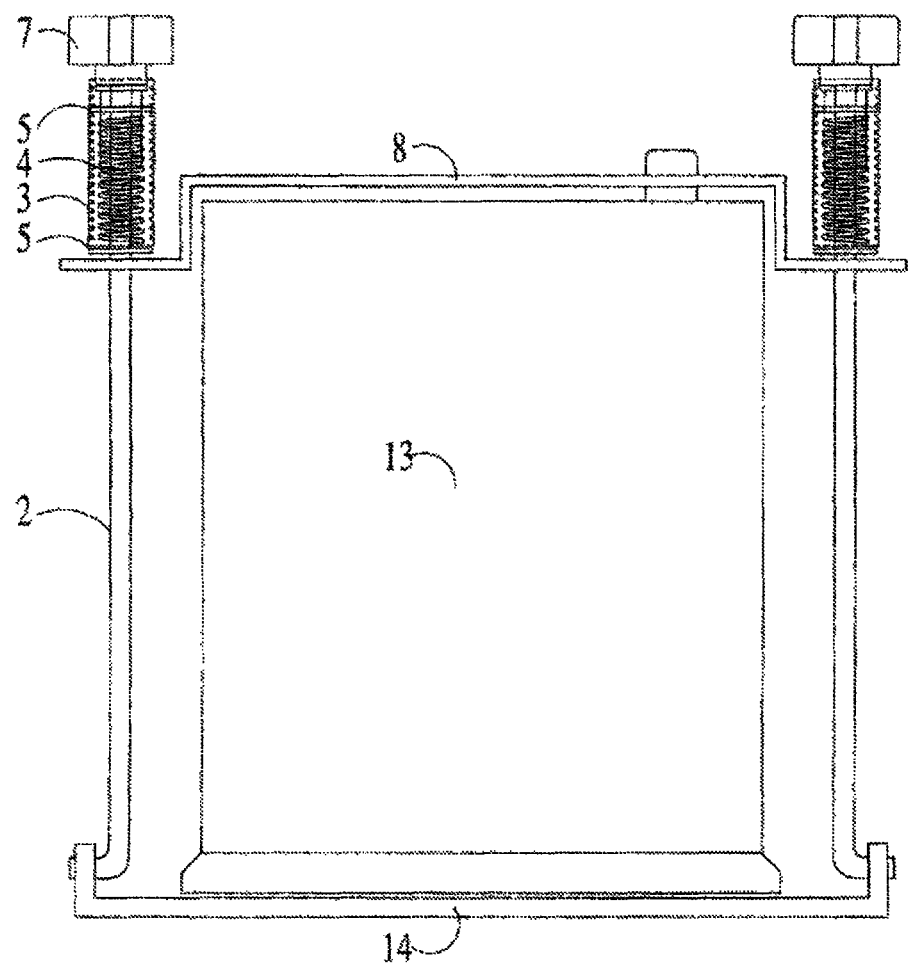
FIG. 7 is an illustration of the method and device of one embodiment of the present invention for securing a battery to the battery tray in accordance with one embodiment of the invention.
Figure 8:
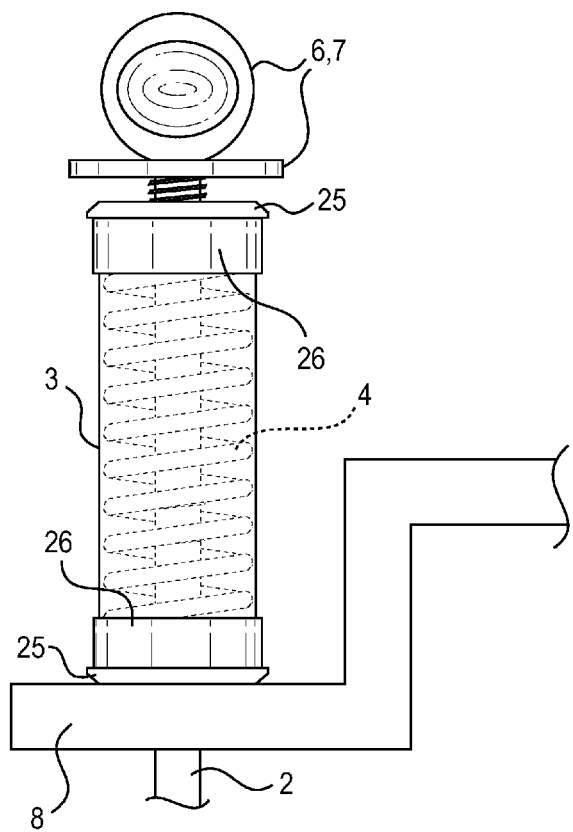
FIG. 8 is a side view of a grippable handle integrally molded unto the tension loaded battery hold down rod composing the compression spring and vibration dampers encased in a spring capsule and top and bottom spring seats.
Figure 9:
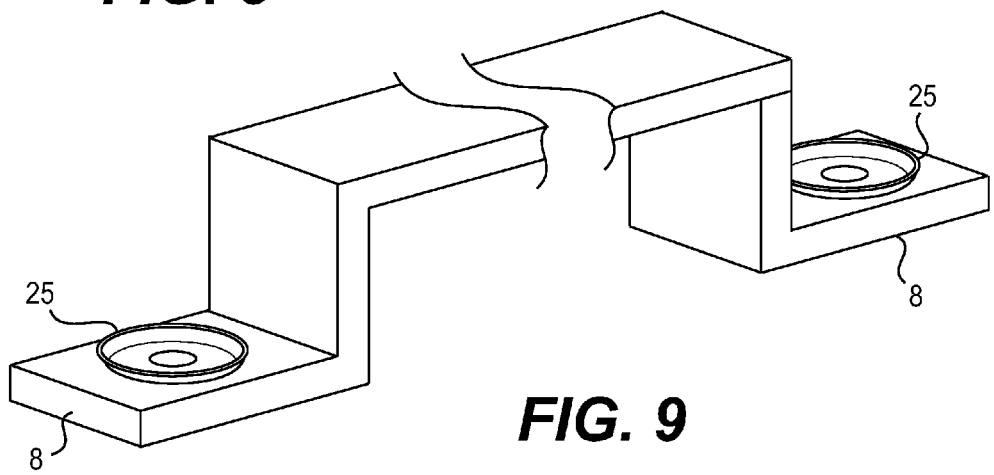
FIG. 9 is a perspective view of a hold down clamp comprising a bottom spring seat.
Figure 10:
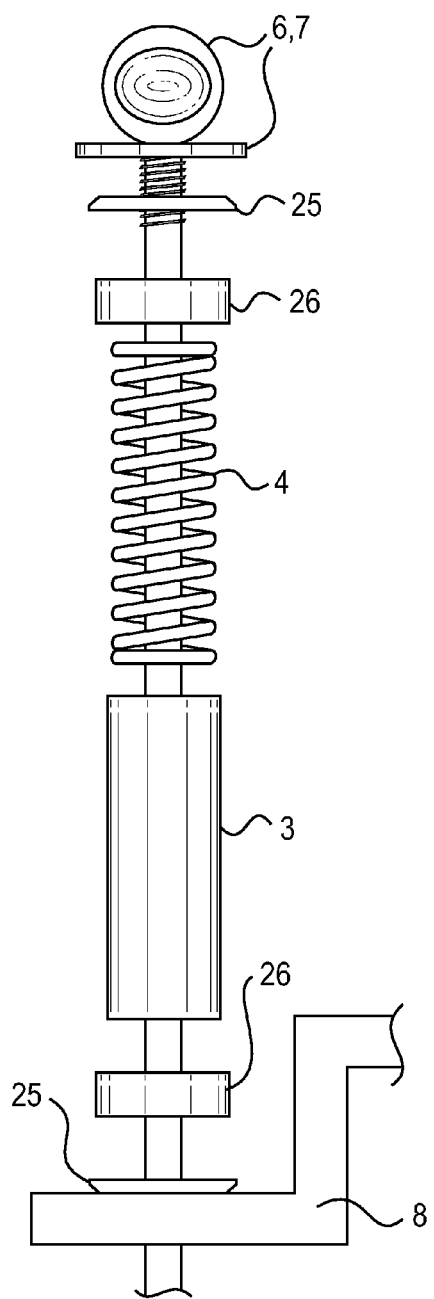
FIG. 10 and FIG. 11 are exploded perspective views of the assembled and disassembled hold down rod with grippable handle integrally molded and compression spring arrangement; wherein the hold down clamp comprises a spring seat. The bottom spring seat may serve as a vibration damper or the spring arrangement may provide an optional vibration damper.
Figure 11:
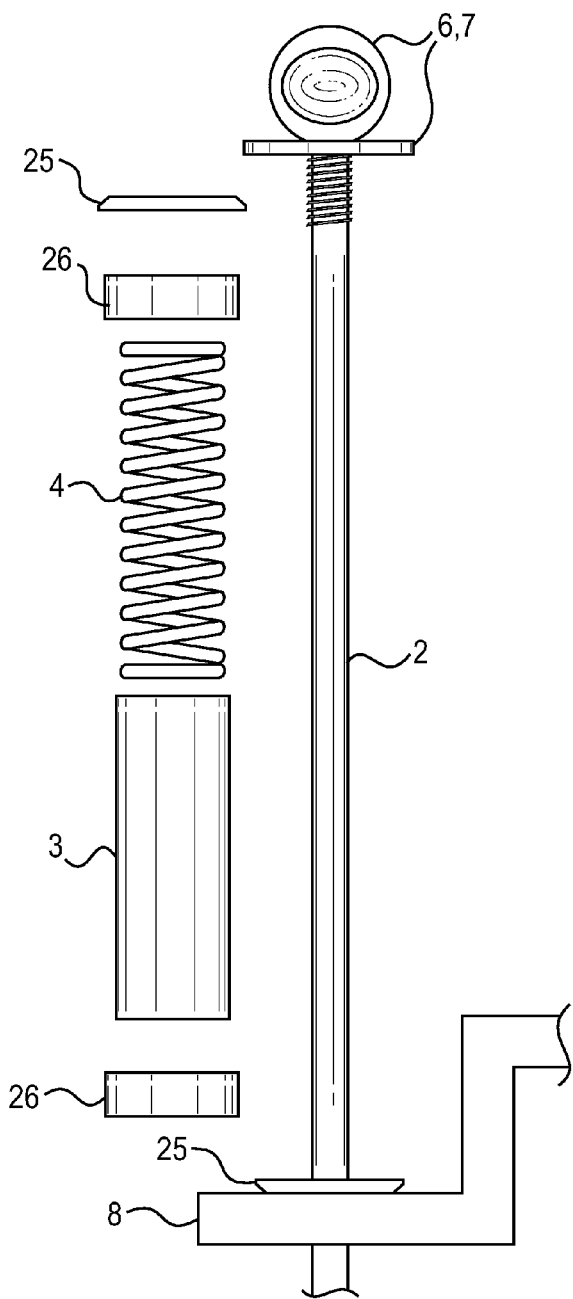
Figure 12:
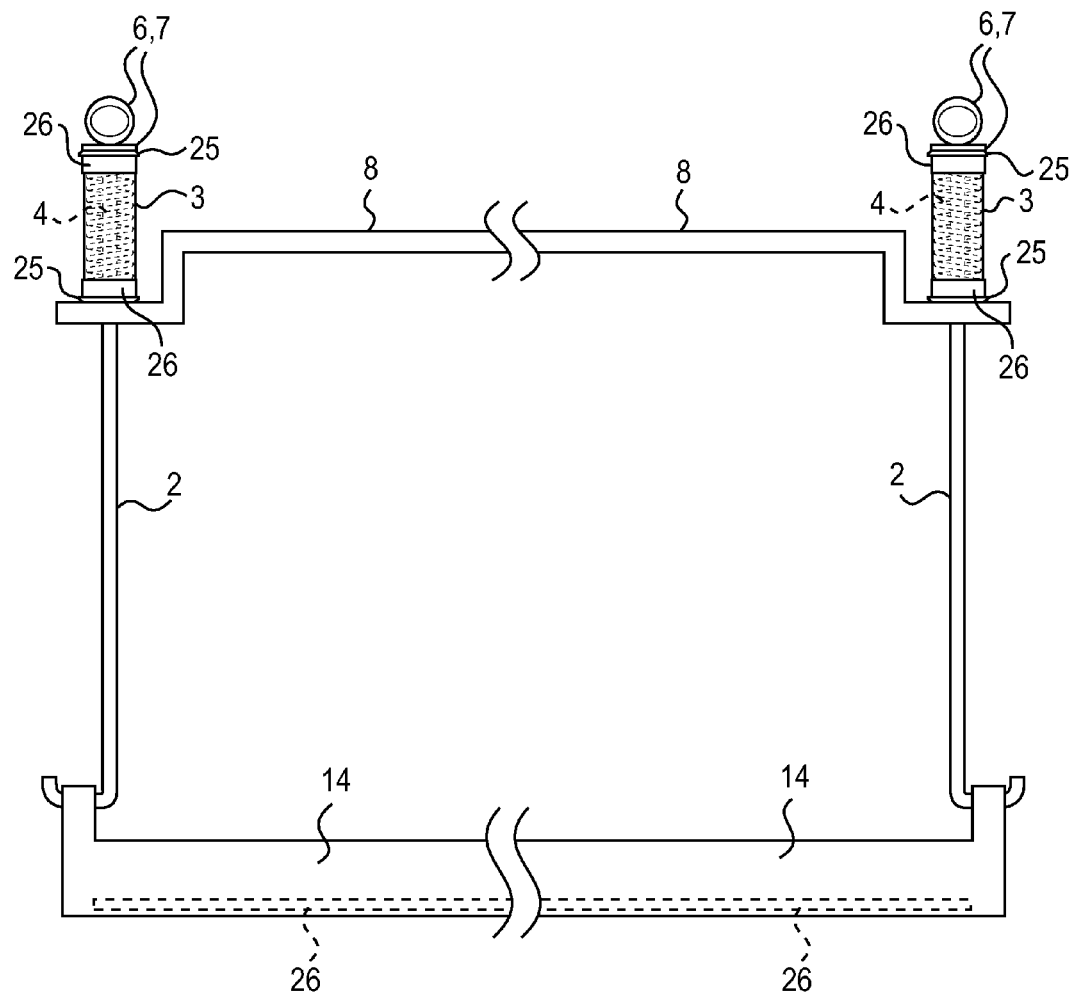
FIG. 12 is a side view of an assembled battery hold down device into the battery receiving tray.
Figure 13:
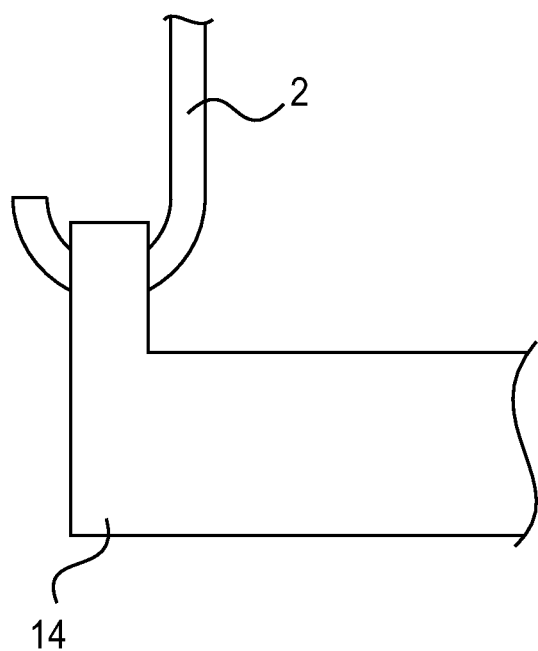
FIG. 13 and FIG. 14 are perspective views of the battery receiving tray comprising a vibration damper with a j-rod with curved end for slottable engagement with the battery receiving tray.
Figure 14:
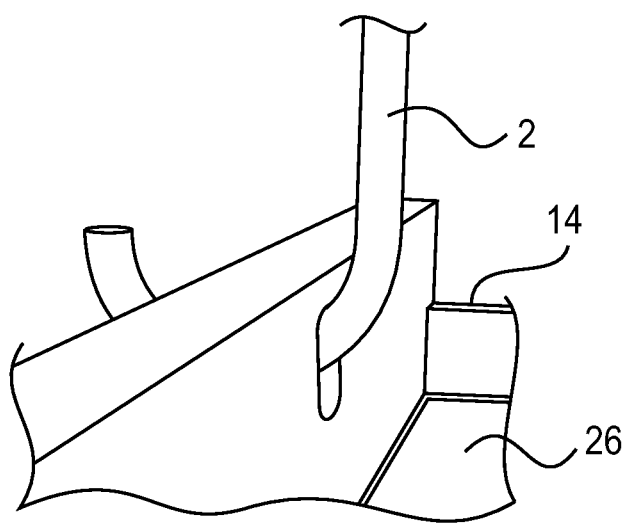

It is understood that threaded hold down rods 2 are somewhat standard in the automotive industry. Unless the hold down rod 2 that exists in a vehicle is rusted or corroded to such an extent that the professional recommendation is to replace them, the grippable handle 6 or 7 of the present invention can be retrofitted unto such existing rods. Thus a retrofit of the current hold down mechanisms found in most vehicles would simply involve inserting a tensioner 4 (e.g., compression spring), preferably already preassembled in a spring capsule 3, and holding same down against the hold down clamp 8 by means of a grippable handle 6 or 7 threaded unto pre-existing hold down rods as shown in FIG. 7.

It is also understood that the tension loaded hold down rod of the instant invention is adaptable for use in many battery hold down mechanisms requiring one or more hold down rods 2 and one or more hold down clamps 8 and not restricted to the particular hold down mechanisms herein described.

It is further understood that the grippable handle 6 or 7 and hold down rod 2 of the present invention can be made of any suitable material known in the art including but not limited to galvanized steel, stainless steel, or any untreated metal or metal treated with any paint, enamel, powder coating, or polyplastic covering that protects it from rust or corrosion; or made of acetal or acetal resin, PVC or PVC resin, or any other polyplastic or comparable material with a rigid structure sufficient to secure the battery 13 to the battery receiving tray 14. It is not intended that this invention be limited in anyway by the nature of the materials used in constructing the various embodiments.

Furthermore, the grippable handle 6 or 7 can be used to adjust the tension on the tensioner 4 (e.g., compression spring) leading either to the total restriction of the battery's 13 movement in relation to the battery receiving tray 14 or allowing enough give and flexibility to attenuate or absorb shock during the natural movement of a machine. However, it is also within the scope of the present invention to create a hold down rod 2 integral with a grippable handle 6 or 7 of various shapes and sizes, and made of any suitable material, preferably acid resistant, non-corrosive metals or plastics. A grippable handle is most preferred. It is also understood that the other end of the hold down rod 2, can be a J, L, hook, or any other shape or means for securely engaging the battery receiving tray 14 for secure restraint of the battery 13 in the battery receiving tray 14.

Figure 3:
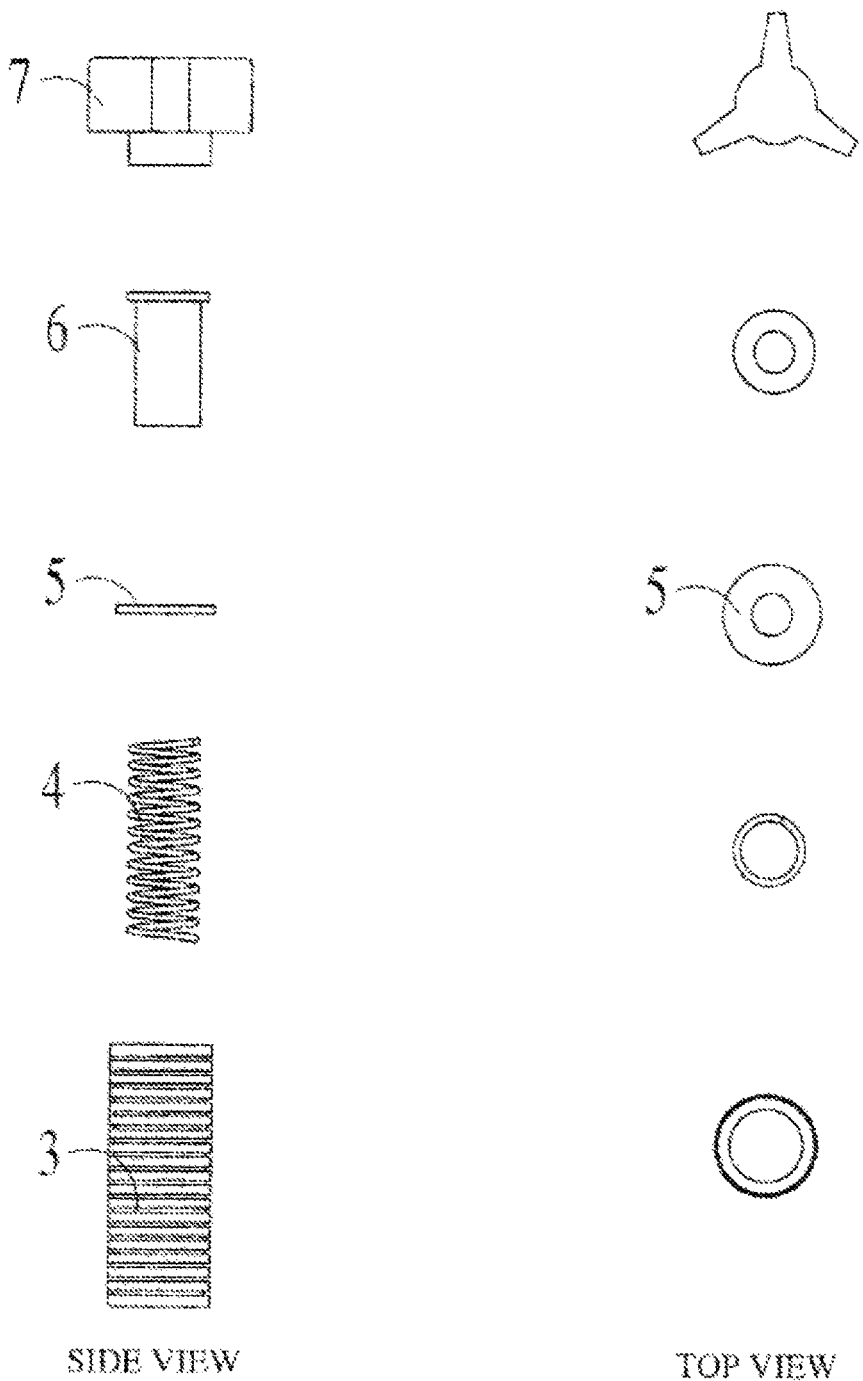
FIG. 3 is a side and top view of a compression spring, compression spring pressure point, compression spring capsule, and grippable spring retaining means in accordance with one embodiment of the invention.

FIG. 3 is a side and top view of a compression spring 4, compression spring pressure point 5 (e.g., spring seat), spring capsule 3, and grippable spring retaining means 7 (e.g., a grippable handle) in accordance with one embodiment of the invention. A supportive ring or flat washer or pressure point 5 (e.g., spring seat) is placed above and below the compression spring 4 and is then encased in a protective bellow, corrugated rubber boot, or any similar protective shield or cover made of polyplastic material 3 (e.g., spring capsule). In a preferred embodiment, the compression spring 4 and the compression spring pressure point 5 (e.g., spring seat) are contained in spring capsule 3 thus minimizing the number of parts and allows for consistent and balanced pressure to be distributed properly throughout the hold down mechanism. Further, proper encasement in the spring capsule 3, protects the compression spring 4 and the supportive rings or top and bottom spring seats 5 from the potentially corrosive environment associated with the battery 13.

Figure 4:
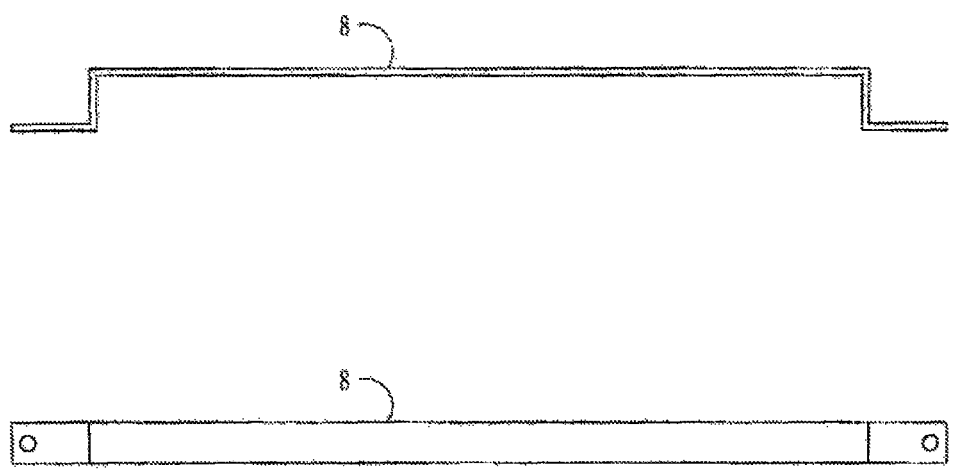
FIG. 4 is a side and top down view of a simple hold down clamp of a flat stock, bent to conform to the contours of an automotive battery in accordance with one embodiment of the invention.

FIG. 4 is a side and top down view of a simple hold down clamp of a flat stock, bent to conform to the contours of an automotive battery in accordance with one embodiment of the invention. Preferably the hold down clamp 8 is a simple flat bar preferably bent downward approximately 90 degrees and upward approximately 90 degrees to conform to the contours of the battery 13 as shown in FIG. 7. The back-to-back 90 degree bends on the hold down clamp 8 is to ensure that the grippable handle 6 or 7 is ultimately flush or near flush with the top of the battery 13 after the hold down rod 2 engages the battery receiving tray 14 at the opposite end. In the engine compartment of a vehicle, it is preferred that the grippable handle 6 or 7 extends no further than the top of the battery terminals.

If the opposing openings in the battery receiving tray 14 for the engagement of the hold down rods 2 are offset one to the other, as is the case with several vehicle makes and models the hold down clamp 8 can be constructed with several openings on opposite ends to accommodate such an offset.

Figure 5:
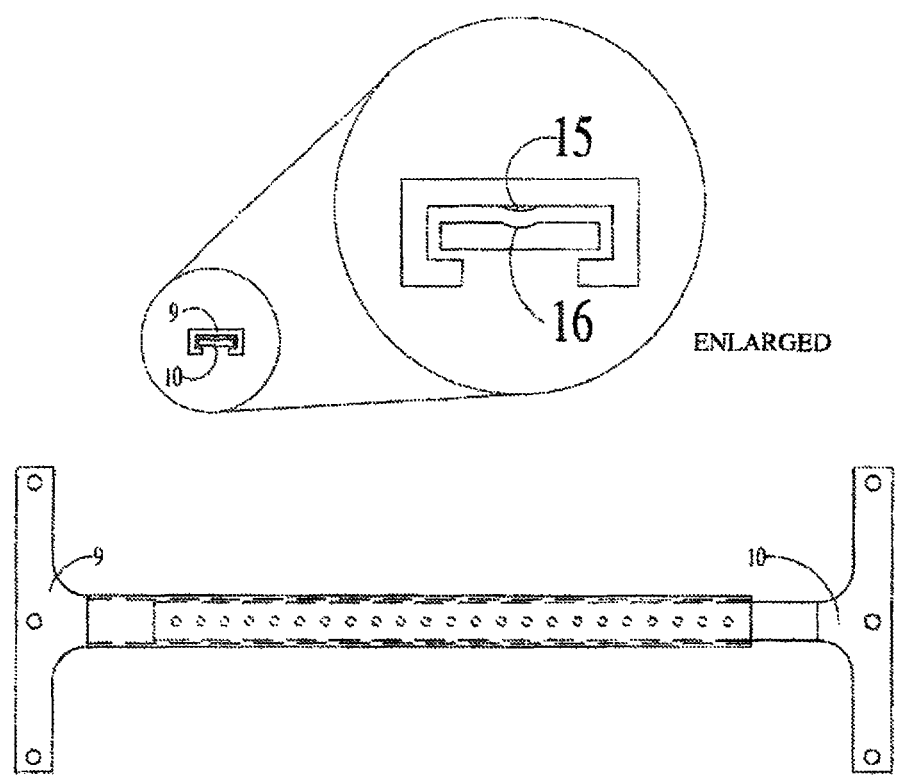
FIG. 5 is a top down view of an extendable hold down clamp with detents and concaved grooves/depressions for incremental and restrictive lateral extension of the hold down clamp in accordance with one embodiment of the invention.
Figure 6:
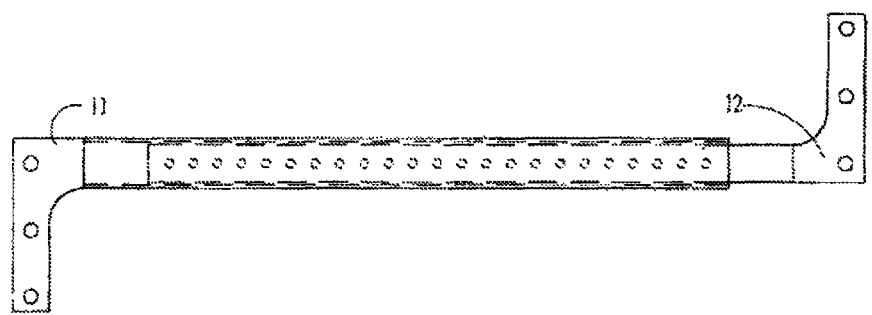
FIG. 6 is a top down view of another form of an extendable hold down clamp with detents and concaved grooves/depressions for incremental and restrictive lateral extension of the hold down clamp in accordance with one embodiment of the invention.

In certain instances, it may be desirable to use an adjustable hold down clamp 9 or 10. FIG. 5 is a top down view of an extendable hold down clamp with detents and concaved grooves/depressions 16 for incremental and restrictive lateral extension of the hold down clamp 8 in accordance with one embodiment of the invention. Further, FIG. 6 is a top down view of another form of an extendable hold down clamp with detents 15 and concaved grooves/depressions 16 for incremental and restrictive lateral extension of the hold down clamp in accordance with another embodiment of the invention.

FIG. 5 shows an H configuration wherein the longer side with detents 15 and concaved grooves/depressions 16 are viewed on the X axis and the shorter sides have openings along the Y axis for the engagement of the hold down rods 2. Yet another embodiment of an adjustable hold down clamp 11, 12 in a Z configuration is shown in FIG. 6. As in the case of the nonextendable hold down clamp 8, the present invention also provides extendable hold down clamps (9, 10) or (11, 12) to conform to the contours of the battery 13. The upper portion of the hold down clamps 9 or 11 for illustrative purposes is shown in a C configuration notched or hollowed out wherein the open face of the C is facing downward and two points for the entire length of the clamp 9 or 11 lay flat on the top of the battery 13 crossing between the battery posts. The hold down clamp 9 or 11 has a number of detents 15 on the underside of the top portion of the embodiment. The lower portion of the hold down clamps 10 or 12 for illustrative purposes is shown as a flat stock made to fit into the C of the upper portion of the clamp 9 or 11 such that it slides in and abuts or rests on the interior walls of the two points of the C that rests on the battery 13. The flat stock of the lower portion of the clamp 10 or 12 has concaved grooves/depressions 16 at the top and in direct opposition to the detents 15 for the length as is seen fitting. The locking property associated with the detent 15 and concaved groove/depression 16 mechanism herein discussed is a precautionary means—used for minor lateral adjustments. The primary locking means as far as the hold down mechanism is concerned is the vertical downward pressure of the collaborative force exerted from the compression spring 4 and the grippable handle 6 or 7 against the hold down clamp 8 pulling the hold down rod 2 upward.

FIG. 7 is an illustration of the method and device of one embodiment of the present invention for securing a battery to the battery tray in accordance with one embodiment of the invention. In one embodiment, each grippable handle 6 or 7 is first threaded into the threaded ends 1 of the hold down rods 2, the J ends of both hold down rods 2 are then inserted into the respective openings in the hold down clamp 8. The hold down clamp 8 is then placed over the battery 13, straddling it in such a way that the J ends of the one hold down rod 2 is adjacent the hole or opening of the battery receiving tray 14 and the second hold down rod 2 is adjacent the opposite designated hole or opening of the battery receiving tray 14. At this point the grippable handle 6 or 7 is depressed collapsing the spring—the J shaped end of the hold down rod 2 being pushed down in such a way as to line up parallel to the hole in the battery receiving tray 14. The J of the hold down rod 2 is now turned toward the hole in the battery receiving tray 14 and pivoted to totally engage the battery receiving tray 14. The grippable handle 6 or 7 is now released allowing the compression spring 4 to rest in its naturally open state. The pressure exerted unto the hold down clamp 8 and by extension unto the battery 13 downward and on the grippable handle 6 or 7 upward is sufficient to keep the battery 13 secure and in place against the battery receiving tray 14.

Since the hold down rod 2 would have been cut to a predetermined length wherein once the compression spring 4 is in its naturally relaxed state the hold down rod 2 is pulled to a fully taut position upward, then in order for the hold down rod 2 to be disengaged from the battery receiving tray 14, a targeted and sustained force downward would have to be exerted unto the grippable handle 6 or 7 then to and through the compression spring 4 fully depressing it and through the hold down clamp 8—as an equal and opposite force against the natural state of the compression spring 4. The same targeted and sustained force would have to push the J shaped end of the hold down rod 2 out and away from the hole in the battery receiving tray 14 at the precise angle that would allow it to clear the hole away from, and fully disengage, the battery receiving tray 14.

Although this method has been described with respect to a top mounted hold down clamp, it is understood that this invention is not limited by the positioning or arrangement of the hold down clamp.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents. Accordingly, the invention is not limited by the embodiments described above which are presented as examples only but can be modified in various ways within the scope of protection defined by the appended patent claims.

What is claimed:

1. A battery hold down assembly for securely clamping and unclamping a battery in a battery receiving tray, said assembly comprising:
    at least one hold down rod wherein the rod is a j-rod having a j or curved end configured for slottable engagement of a corresponding opening on the battery receiving tray, and
    one or more horizontally disposed hold down clamps comprising flat stock bent to conform to the contour of the battery, the hold down clamp having one or more openings for passage of the rod there through and configured for incremental and restrictive lateral extension of said clamp achieved through detents and concaved grooves/depressions, and
    wherein the hold down rod comprises a tensioner for holding down the one or more hold down clamps against the battery and a tensioner retaining means for retaining the tensioner on the hold down rod, and
    wherein the tensioner comprises a compression spring arrangement and the compression spring arrangement comprises a coil spring and the tensioner retaining means comprises a depressible grippable handle, and
    wherein the battery hold down assembly is configured to clamp the battery onto the battery receiving tray which is achieved as the coil spring exerts pressure against the grippable handle and against the hold down clamp while simultaneously forcing the j end or the curved end of the hold down rod to remain taut against the battery receiving tray.

2. The battery hold down assembly of claim 1, wherein the compression spring arrangement further comprises top and bottom spring seats.

3. The battery hold down assembly of claim 2, wherein one or both of the top and bottom spring seats further comprises a vibration damper.

4. The battery hold down assembly of claim 3, wherein the top spring seat and vibration damper are incorporated in the grippable handle.

5. The battery hold down assembly of claim 2, wherein the compression spring arrangement is encased in a spring capsule.

6. The battery hold down assembly of claim 2, wherein the hold down clamp further comprises a bottom spring seat and a vibration damper.

7. The battery hold down assembly of claim 1, wherein the depressible grippable handle is integrally molded unto the hold down rod.

8. The battery hold down assembly of claim 1, wherein the depressible grippable handle is screwedly connected to the hold down rod.

9. The battery hold down assembly of claim 1,
    wherein the at least one hold down rod comprises two hold down rods, for engagement of the openings on opposite sides of one of the hold down clamps.

10. The battery hold down assembly of claim 1, wherein the battery receiving tray further comprises a vibration damper.

11. A tension loaded battery hold down rod adaptable for use in a battery hold down assembly for securely clamping and unclamping a battery in a battery receiving tray, said hold down rod comprising:
    a j or curved end configured for slottable engagement of a corresponding opening on the battery receiving tray, and at another end comprising a tensioner and a tensioner retaining means for engagement of one or more battery hold down clamps, and wherein the tensioner comprises a compression spring arrangement and the compression spring arrangement comprises a coil spring and the tensioner retaining means comprises a depressible grippable handle, and wherein the battery hold down assembly, to which the tension loaded battery hold down rod is adapted, is configured to clamp the battery onto the battery receiving tray which is achieved as the coil spring exerts pressure against the grippable handle and against the hold down clamp while simultaneously forcing the j end or the curved end of the hold down rod to remain taut against the battery receiving tray.

12. The tension loaded battery hold down rod of claim 11, wherein the spring arrangement further comprises a vibration damper.

13. The tension loaded battery hold down rod of claim 11, wherein the compression spring arrangement is encased in a spring capsule.

14. A method for securely clamping and unclamping a battery in a battery receiving tray, wherein at least one hold down rod comprising:

a j or curved end configured for slottable engagement of a corresponding opening on the battery receiving tray is securely connected to the battery receiving tray on one end and at another end, the hold down rod is held against one or more horizontally disposed hold down clamps by tension provided by a compression spring tensioner operating against a tensioner retaining means comprising a depressible grippable handle at the other end of the hold down rod and the one or more hold down clamps and wherein clamping and unclamping of the battery is achieved by a method comprising depressing the grippable handle operating against the compression spring tensioner wherein the compression spring tensioner comprises a compression spring arrangement, and wherein the compression spring arrangement comprises a coil spring and wherein the hold down rod would have been cut to a predetermined length wherein once the coil spring is in its naturally relaxed state the j or curved end of the hold down rod is pulled to a fully taut position against the battery receiving tray, and wherein in order for the hold down rod to be disengaged from the battery receiving tray a targeted and sustained force would have to be applied unto the depressible grippable handle then to and through the coil spring fully depressing it and through the hold down clamp, as an equal and opposite force against the natural state of the coil spring, further wherein the same targeted and sustained force would have to push the j or curved end of the hold down rod out and away from the corresponding opening in the battery receiving tray at the precise angle that would allow the j or curved end to clear the corresponding opening away from, and fully disengage, the battery receiving tray.

15. The method of claim 14, wherein the compression spring arrangement is encased in a spring capsule.

16. The method of claim 14, wherein the grippable handle is integrally molded unto the hold down rod.

17. The method of claim 14, wherein the grippable handle is screwedly connected to the hold down rod.

18. The method of claim 14, wherein the at least one hold down rod comprises two hold down rods engaged on opposite sides of one of the hold down clamps.

19. The method of claim 14, wherein the hold down clamp is configured for incremental and restrictive lateral extension achieved through detents and concaved grooves/depressions.

20. The method of claim 14, wherein the one or more hold down clamps is top mounted.

\* \* \* \* \*